United States Patent
Shaanan et al.

(10) Patent No.: US 7,570,235 B2
(45) Date of Patent: Aug. 4, 2009

(54) COMMUNICATION DIODE DRIVER CIRCUIT

(75) Inventors: Tamir Shaanan, Herzlia (IL); Lev Freilicher, Netanya (IL); Leonid Shvey, Netanya (IL)

(73) Assignee: Infra-Com Ltd. (IL)

( * ) Notice: Subject to any disclaimer, the term of this patent is extended or adjusted under 35 U.S.C. 154(b) by 674 days.

(21) Appl. No.: 10/576,343

(22) PCT Filed: Mar. 20, 2005

(86) PCT No.: PCT/IL2005/000317

§ 371 (c)(1),
(2), (4) Date: Apr. 18, 2006

(87) PCT Pub. No.: WO2006/072929

PCT Pub. Date: Jul. 13, 2006

(65) Prior Publication Data

US 2007/0104075 A1    May 10, 2007

Related U.S. Application Data

(60) Provisional application No. 60/641,896, filed on Jan. 6, 2005.

(51) Int. Cl.
*G09G 3/32* (2006.01)
*H05B 41/16* (2006.01)

(52) U.S. Cl. ............ 345/82; 345/90; 345/102; 345/211; 345/212; 315/247; 315/185 S; 315/291; 315/324

(58) Field of Classification Search .......... 345/82, 345/83, 90, 98, 102, 211, 212, 214; 315/247, 315/246, 224, 225, 291, 307–311, 297, 312–326, 315/185 S See application file for complete search history.

(56) References Cited

U.S. PATENT DOCUMENTS

| 4,622,477 A | 11/1986 | Uda |
| 5,329,210 A | 7/1994 | Peterson et al. |
| 6,198,405 B1 | 3/2001 | Andersson et al. |

(Continued)

FOREIGN PATENT DOCUMENTS

| GB | 2162399 | 1/1986 |
| GB | 2381138 A | 4/2003 |

(Continued)

OTHER PUBLICATIONS

Patent Abstracts of Japan vol. 008, No. 231 (E-274), Oct. 24, 1984.

(Continued)

*Primary Examiner*—Tuyet Vo
(74) *Attorney, Agent, or Firm*—Galbreath Law Offices, P.C.; John A. Galbreath

(57) ABSTRACT

A Communication Diode Driver Circuit (CDDC) for selectively illuminating communication diodes (CDs) in response to incoming digital data pulses with a LED drive current $I_{LED}(t)$ close to a nominal LED drive current $I_N$ therefor in a steady state operation of the CDDC. The CDDC includes a driver unit for driving the LED drive current $I_{LED}(t)$, and a closed loop feedback unit for continuously monitoring the LED drive current $I_{LED}(t)$ for providing a variable shift voltage $SV(t)$. The driver unit includes a shift amplifier for combining a pulsed analog data voltage $ADV(t)$ corresponding to incoming digital data pulses, and the shift voltage $SV(t)$.

8 Claims, 5 Drawing Sheets

U.S. PATENT DOCUMENTS

| | | | |
|---|---|---|---|
| 6,400,101 | B1 | 6/2002 | Biebl et al. |
| 6,586,890 | B2 | 7/2003 | Min et al. |
| 7,307,614 | B2 * | 12/2007 | Vinn .................. 345/102 |
| 2001/0033503 | A1 | 10/2001 | Hamp et al. |
| 2003/0025465 | A1 | 2/2003 | Swanson et al. |
| 2003/0041620 | A1 | 3/2003 | Gruber et al. |
| 2003/0122502 | A1 | 7/2003 | Clauberg |
| 2003/0218585 | A1 | 11/2003 | Hoshi et al. |

FOREIGN PATENT DOCUMENTS

| | | |
|---|---|---|
| JP | 59-112670 A | 6/1984 |
| JP | 63110685 | 5/1988 |
| JP | 2003-101123 A | 4/2003 |

OTHER PUBLICATIONS

A PWM modulator for wireless infrared communication, by Koyuncu, Mesut et al., STW-2000 09 26-02:27, pp. 351-353, Nov. 30-Dec. 1, 2000.

* cited by examiner

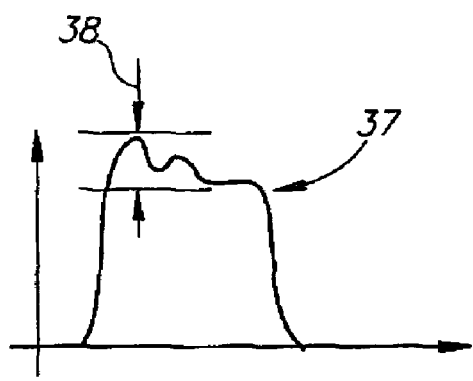 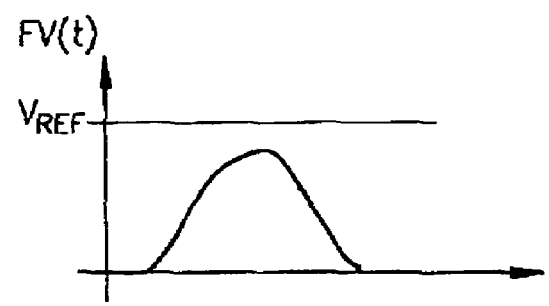
FIG.3A          FIG.3B
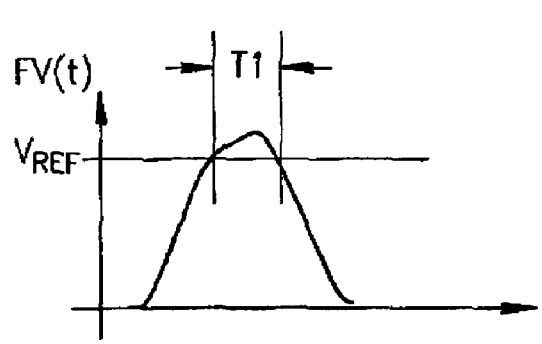 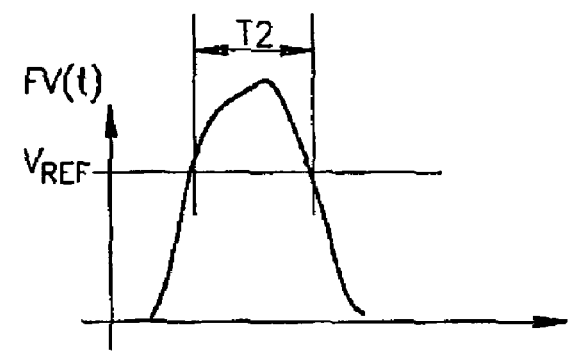
FIG.3C          FIG.3D

COMMUNICATION DIODE DRIVER CIRCUIT

FIELD OF THE INVENTION

The invention pertains to communication diode driver circuits for selectively illuminating at least one communication diode for wireless optical data transmission purposes.

BACKGROUND OF THE INVENTION

Infrared (IR) data transmission devices include one or more Light Emitting Diodes (LEDs) or Laser Diodes (LDs) (hereinafter commonly referred to as Communication Diodes (CDs)) for wireless optical data transmission purposes. Exemplary LEDs for IR data transmission devices include inter alia Model No. SFH 4000, commercially available from OSRAM Opto Semiconductors GmbH & Co. OHG Werner-werkstrasse 2, D-93049 Regenburg Germany. Exemplary LDs for IR data transmission devices include inter alia Model No. MTE8087T, commercially available from Marktech Optoelectronics, 120 Broadway Menands, N.Y., 12204, U.S.A. CDs have an inherent typical forward voltage $V_f$ in the region of 1.4V to 2.5V, depending on their type and operational conditions but suffer from a relatively large $V_f$ tolerance in the region of ±15% due to manufacturing processes. CDs may be screened to meet a particular design specification but this time consuming approach is prohibitively expensive for certain equipment, for example, consumer electronic devices. Moreover, CDs have a temperature coefficient $TC_V$ of about −1.5 mV/K, such that a 10° C. temperature increase leads to an about 15 mV decrease in a CD's forward voltage $V_f$.

Mains and battery powered consumer electronic devices have undergone a major change in the last few years, and are now largely required to operate with low power supply voltages $V_{CC}$ of +5V, +3.3V and even +2.5V. Driver circuits for driving one or more parallel Communication Light Emitting Circuits (CLECs) typically include a single CD along a Communication Light Emitting Branch (CLEB) strapped between a power supply voltage $V_{CC}$ and GND in the case of +3.3V power supply, a pair of CDs along an CLEB in the case of +5V power supply, and possibly three CDs or more in the case of higher power supply voltages. Communication Diode Driver Circuits (CDDCs) are designed to illuminate CDs at about 90% of their maximum average LED drive current $I_{max}$ hereinafter referred to as a nominal LED drive current $I_N$ so as not to shorten their lifetimes or cause malfunctions. However, power supply voltages can fluctuate by up to ±10%, which compounded with the variances of CDs' forward voltages $V_f$, and their inherent temperature dependency, can often lead to either insufficient or over-increased actual LED drive currents $I_{LED}(t)$. In the event that $I_{LED}(t) < I_N$, there is a resultant drop in CD light emission intensity thereby reducing the effective data transmission range, or in extreme circumstances precluding communication entirely. Against that, in the event that $I_{LED}(t) > I_N$ for prolonged periods, a CDDC drives its CDs with an excessive LED drive current $I_{LED}(t)$, possibly shortening their lifetimes, or in extreme circumstances causing irreparable damage. Moreover, certain data transmission applications mandate relatively few or scarce digital data pulses arriving irregularly, thereby further complicating the design of a CDDC for accurately driving CDs.

One conventional approach for driving CDs includes the use of a so-called ballast resistor having a relatively large resistance, whereby the ballast resistor becomes the major device determining an actual LED drive current $I_{LED}(t)$ along an CLEB. Exemplary prior art references implementing this approach include inter alia GB 2 162 399 entitled LED modulator, U.S. Pat. No. 5,329,210 to Peterson et al., and U.S. Pat. No. 6,198,405 to Andersson et al. However, this approach typically requires a relatively high power supply voltage, and suffers from a poor overall device efficiency of 50% or even less due to considerable heat dissipation at the ballast resistor. Moreover, such heat dissipation can be disruptive to other nearby electronic devices rendering this technique unacceptable for certain applications.

Another conventional approach is to use Pulse Width Modulation (PWM) for controlling an actual LED drive current $I_{LED}(t)$ along an CLEB by changing pulse widths by means of a μcontroller core, timers, counters, pre-scalers, and the like. One exemplary PWM scheme is implemented in Microchip's PIC 16C781 commercially available from Microchip Technology, Inc., Christina Hecht, USA. Other PWM implementations are illustrated and described in GB 2 381 138 entitled 'Driver circuit for light emitting devices', U.S. Pat. No. 4,622,477 to Uda, U.S. Pat. No. 6,586,890 to Min et al., US Pub. No. 2003/0025465 to Swanson et al., US Pub. No. 2003/0122502 to Clauberg et al., US Pub. No. 2003/0041620 to D'Angelo et al., and an article entitled "A PWM modulator for wireless infrared communication", by Koyuncu, Mesut et al., STW-2000 09 26-02:27, pages 351-353, Nov. 30-Dec. 1, 2000.

Other approaches for controlling LED drive currents are illustrated and described in inter alia JP 2003101123 entitled Semiconductor Laser Driver, US Patent Application Publication No. US 2003/0218585, and JP 63110685 entitled Drive Circuit of Light Emitting Element.

SUMMARY OF THE INVENTION

Generally speaking, the present invention is directed toward a Communication Diode Driver Circuit (CDDC) for selectively illuminating CDs in response to incoming digital data pulses with an LED drive current $I_{LED}(t)$ where $I_{LED}(t) = I_N \pm 3\%$, and even more preferably $I_N \pm 1\%$, upon having settled into a steady state operation by virtue of incoming digital data pulses arriving at a relatively fast rate for a relatively long period of time. The present invention is achieved by continuously providing a shift voltage SV(t) to one input terminal of a two input terminal shift amplifier whose other input terminal is fed with a pulsed analog data voltage ADV(t) corresponding to incoming digital data pulses for issuing a summed up pulsed drive voltage DV(t). The shift voltage SV(t) preferably increases up to a maximum value $SV_{max}$ after a long absence of incoming digital data pulses to ensure that an incoming digital data pulse leads to data transmission even in worst case scenarios but conversely intermittently stepwise decreases on the condition that an actual LED drive current $I_{LED}(t)$ instantaneously illuminating a CLEB's CD(s) is greater than a nominal LED drive current $I_N$. The maximum value $SV_{max}$ is necessarily less than a threshold drive voltage for continuously illuminating a CLEB's one or more CDs.

The CDDC of the present invention processes each single incoming digital data pulse independently without any stipulations regarding their rate of arrival or their adherence to any pattern of arrival, thereby ensuring that the CDDC is in the most prepared state possible for receiving the next incoming digital data pulse. Moreover, the CDDC of the present invention is designed to rapidly converge during a transient state to its steady state operation, and be highly robust to fluctuations in power supply voltages $V_{CC}$, individual CDs' forward voltages $V_f$ and ambient temperature changes and therefore is highly suitable for use in a wide range of data transmission applications. Furthermore, the CDDC of the present inven-

BRIEF DESCRIPTION OF THE DRAWINGS

In order to understand the invention, and to see how it can be carried out in practice, preferred embodiments will now be described, by way of non-limiting examples only, with reference to the accompanying drawings in which similar parts are likewise numbered, and in which:

FIG. 3A is a graph showing amplification of a voltage pulse sensed by a sense resistor of the communication diode driver circuit (CDDC) of FIG. 1 pursuant to an incoming digital data pulse;

FIG. 3B is a graph showing filtering of a voltage pulse sensed by a sense resistor of the communication diode driver circuit (CDDC) of FIG. 1 whose maximum voltage is less than a reference voltage $V_{REF}$;

FIG. 3C is a graph showing filtering of a voltage pulse sensed by a sense resistor of the communication diode driver circuit (CDDC) of FIG. 1 whose maximum voltage is slightly greater than a reference voltage $V_{REF}$;

FIG. 3D is a graph showing filtering of a voltage pulse sensed by a sense resistor of the communication diode driver circuit (CDDC) of FIG. 1 whose maximum voltage is considerably greater than a reference voltage $V_{REF}$;

DETAILED DESCRIPTION OF PREFERRED EMBODIMENTS OF THE INVENTION

Figure 1:
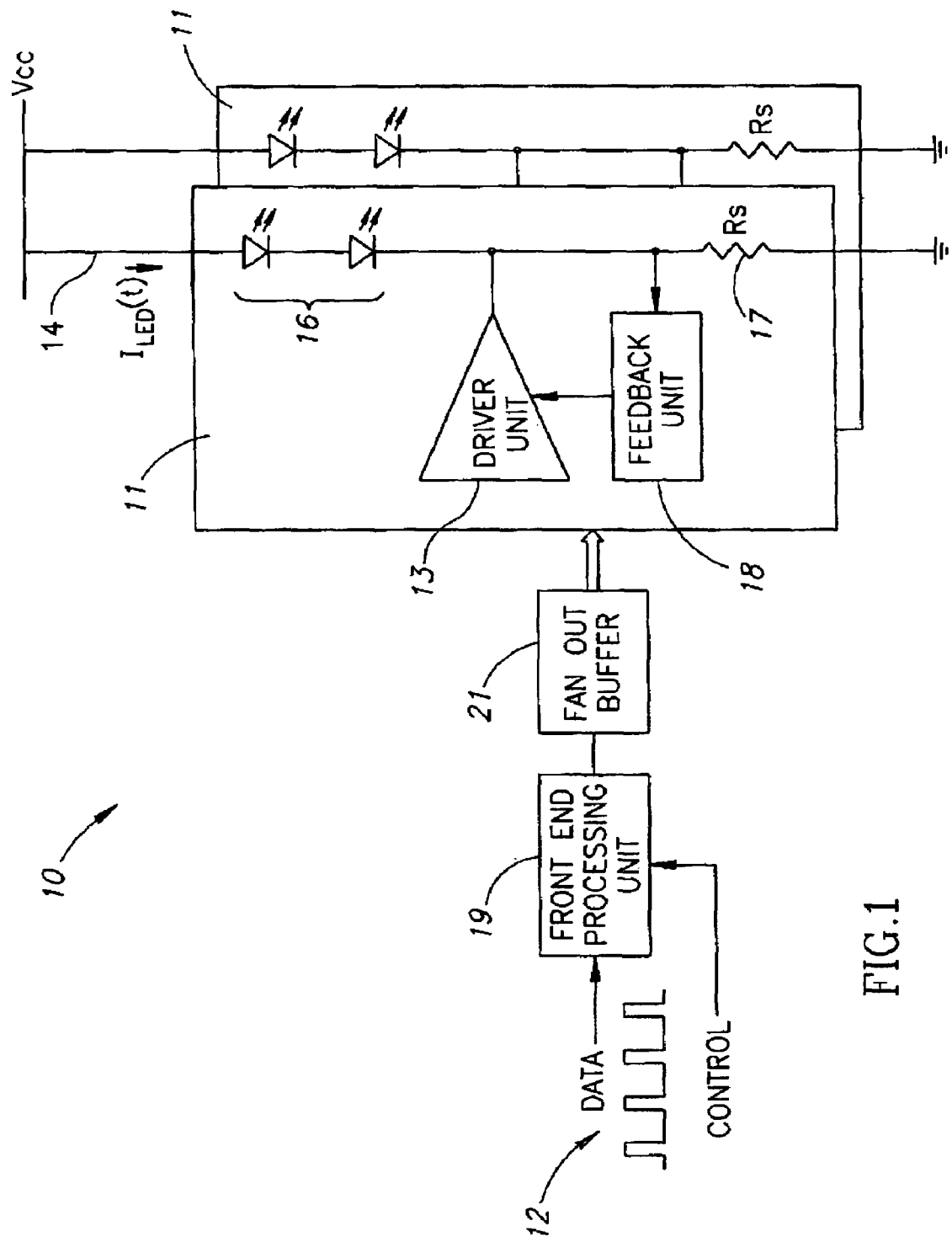
FIG. 1 is a block schematic of a communication diode driver circuit of the present invention.

FIG. 1 shows a Communication Diode Driver Circuit (CDDC) 10 for driving one or more Communication Light Emitting Circuits (CLECs) 11 in accordance with incoming positive digital data pulses 12. Each CLEC 11 includes a driver unit 13 for driving a pulsed LED drive current $I_{LED}(t)$ along a Communication Light Emitting Branch (CLEB) 14 strapped between a power supply voltage $V_{CC}$ and GND. Each CLEB 14 includes a pair of Communication Diodes (CDs) 16 in series with a sense resistor 17 of low resistance $R_S$ tied to ground. Each CLEC 11 further includes a closed loop feedback unit 18 for continuously monitoring a pulsed monitor voltage MV(t) sensed by the sense resistor 17 for providing feedback information regarding the instantaneous values of the pulsed LED drive current $I_{LED}(t)$, which can be higher or lower than a predetermined nominal LED drive current $I_N$ for selectively illuminating the CDs 16. The CDDC 10 further includes a Front End Processing Unit 19 for effecting various digital and/or analog processing functions including inter alia pulse width limitation, stuck at active digital '1' protection, and the like, and a fan out buffer 21 for fanning out the output signal from the Front End Processing Unit 19 to drive all the CLECs 11 with identical input signals, thereby preventing jitter and signal distortion therebetween. The Front End Processing Unit 19 inverts incoming positive digital data pulses to negative digital data pulses since it is more robust to clamp to GND than to a relatively noisy voltage supply level.

Figure 2:
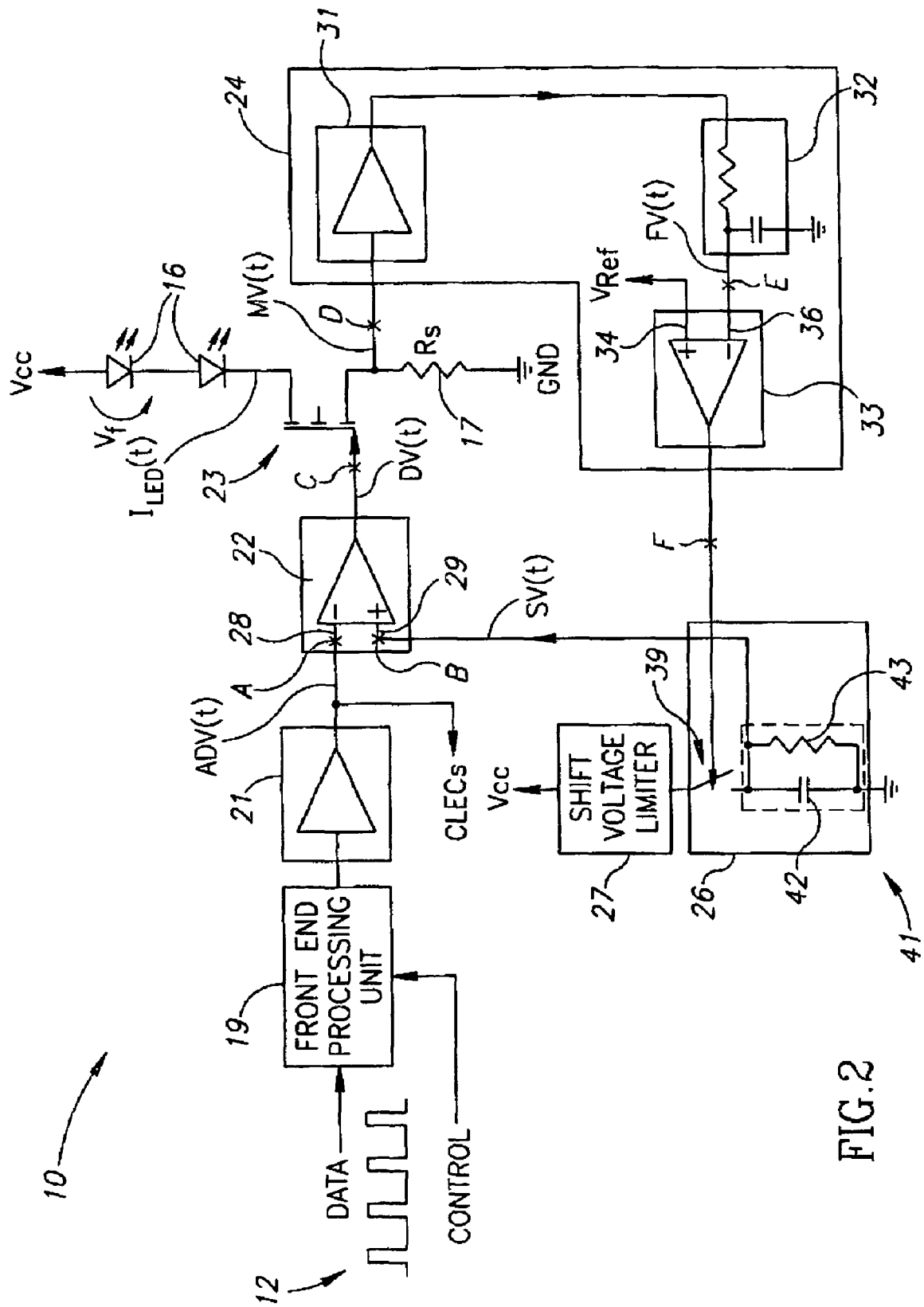
FIG. 2 is a detailed schematic of the communication diode driver circuit of FIG. 1.

FIG. 2 shows that the driver unit 13 includes a two input terminal shift amplifier 22 and a Field Effect Transistor (FET) drive transistor 23, and the closed loop feedback unit 18 includes a toggle unit 24, an integrating unit 26, and a shift voltage limiter 27. Alternatively, the driver unit 13 can be implemented with a bipolar driver transistor, and the like. The shift amplifier 22 has an inverting input terminal 28 connected to the fan out buffer 21 for receiving analog data voltage ADV(t) corresponding to the negative digital data pulses emanating from the fan out buffer 21, and an input terminal 29 connected to the integrating unit 26 for receiving a variable shift voltage SV(t) whereupon the shift amplifier 22 algebraically adds by superposition the analog data voltage ADV(t) and the shift voltage SV(t) to output a summed up drive voltage DV(t).

The toggle unit 24 includes a measurement amplifier 31 having an amplification G tapping a monitor voltage MV(t) sensed by the sense resistor 17, a Low Pass Filter (LPF) 32 for conditioning the amplified monitor voltage MV(T) to issue a feedback voltage FV(t), and a comparator 33 having an input terminal 34 connected to a reference voltage $V_{REF}$ where $V_{REF}=I_N*R_S*G$, and an inverting input terminal 36 for receiving the feedback voltage FV(t). The LPF 32 can be implemented from a passive RC architecture, a higher order passive filter, an active filter that uses various types of amplifiers, and the like. FIG. 3A shows a resultant generally rectangular voltage pulse 37 after being amplified by the measurement amplifier 31 pursuant to an incoming digital data pulse. FIGS. 3B-3D show that the LPF 32 filters voltage overshoots 38 of amplified voltage pulses 37 and also shapes them to largely triangular shaped voltage pulses. The comparator 33 outputs either an ON or OFF digital control state to the integrating unit 26 as follows: the comparator 33 outputs an ON digital control state when $V_{REF}>FV(t)$ (see FIG. 3B) and conversely an OFF digital control state when $FV(t)>V_{REF}$ (see FIGS. 3C and 3D). FIG. 3C and FIG. 3D show that the maximum voltage of the filtered voltage pulses dictates the duration that $FV(t)>V_{REF}$ and consequently the duration that the comparator 33 issues the OFF digital control state. The comparator 33 issues a longer OFF digital control state T2>T1 for the voltage pulse shown in FIG. 3D than that shown in FIG. 3C.

The integrating unit 26 includes a switch 39 operated by the toggle unit 24, and a memory device 41 for providing the shift voltage SV(t) to the shift amplifier 22. The memory device 41 includes a capacitive memory component 42 selectively strapped between the shift voltage limiter 27 and GND to provide the shift voltage SV(t), and a resistive memory component 43 in parallel to the capacitive memory component 42. ON digital control states, on the condition that $I_N>I_{LED}(t)$, close the switch 39 for continuously charging the capacitive memory component 42 for continuously increasing the shift voltage SV(t), up to the shift voltage SV(t)'s maximum value $SV_{max}$, as determined by the shift voltage limiter 27 in the long absence of incoming digital data pulses. Conversely, OFF digital control states resulting from $I_{LED}(t)>I_N$ open the switch 39 to swiftly discharge the capacitive memory component 42 to decrease the shift voltage SV(t) via the resistive memory component 43.

Figure 4:
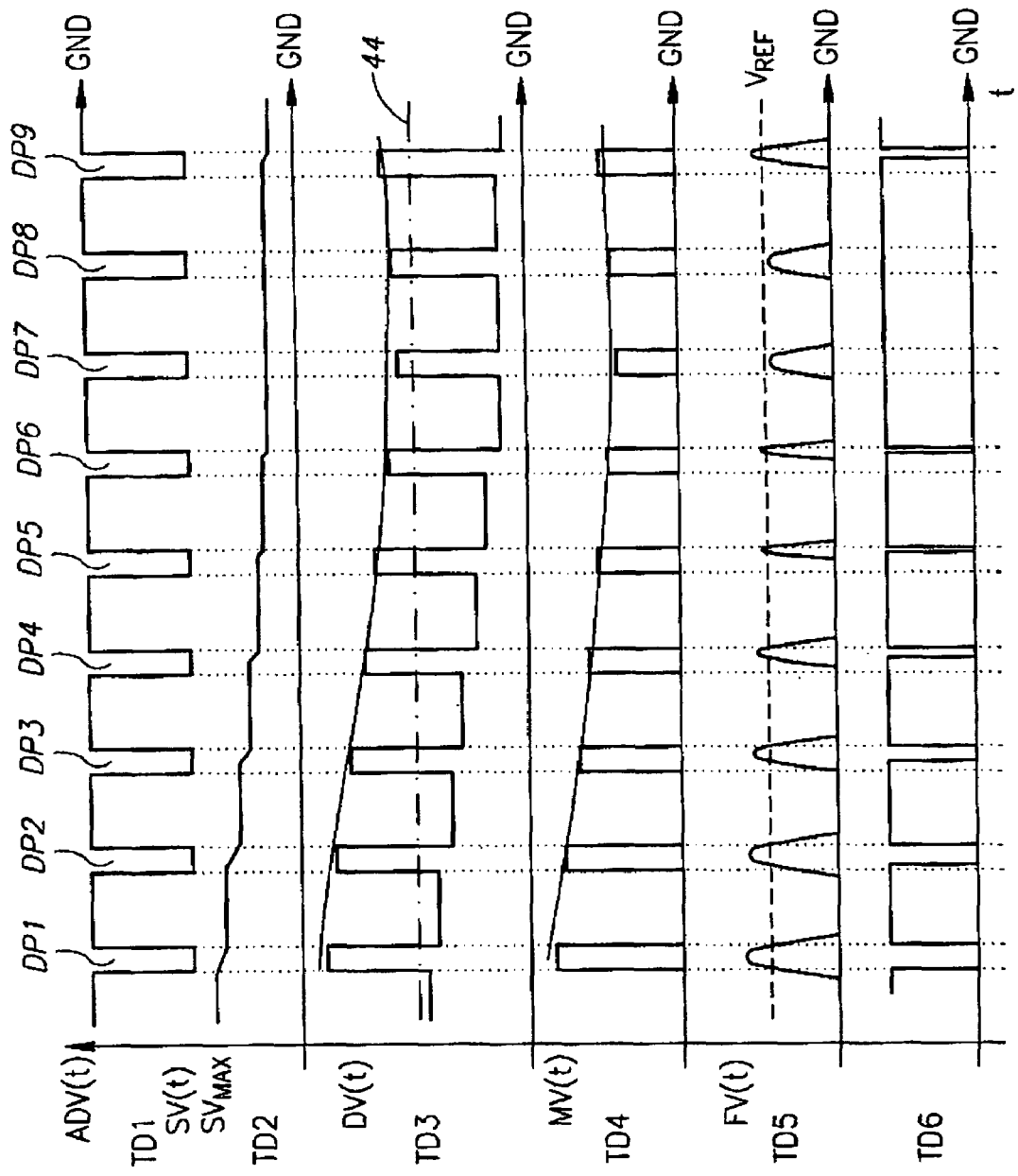
FIG. 4 shows the transient state operation of a communication light emitting circuit (CLEC) of the communication diode driver circuit (CDDC) of FIG. 1 in response to incoming digital data pulses.

FIG. 4 shows six Timing Diagrams TD1-TD6 at six circuit points labeled A, B, C, D, E and F respectively for demonstrating the transient state response of the CLEC 11 to nine digital data pulses DP1, DP2, DP3 . . . , DP9 pursuant to a long absence of incoming digital data pulses. The Timing Diagram TD1 shows the analog data voltage ADV(t) at the circuit point A corresponding to the arrival of the nine digital data pulses. The Timing Diagram TD2 shows the shift voltage SV(t) at the circuit point B periodically decreasing stepwise from its maximum value $SV_{max}$ corresponding to the arrival of the nine digital data pulses. The Timing Diagram TD3 shows the drive voltage DV(t) at the circuit point C relative to the threshold drive voltage 44 for continuously illuminating the CDs 16. The Timing Diagram TD3 shows that the drive voltage DV(t) is greater than the threshold drive voltage 44 for each and every incoming digital data pulse for illuminating the CDs 16. The Timing diagram TD4 shows the monitor voltage MV(t) at the circuit point D decreasing in a similar fashion as the shift voltage SV(t). The Timing Diagram TD5 shows the feedback voltage FV(t) at the circuit point E relative to the reference voltage $V_{REF}$ and that the feedback voltage FV(t) rapidly converges to the reference voltage $V_{REF}$. In particular, the Timing Diagram TD5 shows that $FV(t)>V_{REF}$ for the first six digital data pulses DP1, DP2, ... DP6, $V_{REF}>FV(t)$ for the next two digital data pulses DP7 and DP8, and $FV(t)>V_{REF}$ for the last digital data pulse DP9. Thus, the Timing Diagram TD5 is indicative that $I_{LED}(t)>I_N$ in the case of the digital data pulses DP1, DP2, ... DP6, and DP9, and conversely $I_N>I_{LED}(t)$ in the case of the digital data pulses DP7 and DP8. The Timing Diagram TD6 shows that the switch 39 is in its closed state most of the time and is periodically momentarily opened when $FV(t)>V_{REF}$, namely, $I_{LED}(t)>I_N$, to stepwise decrease the shift voltage SV(t). Moreover, the Timing Diagram TD6 shows that the duration that the switch 39 is open depends on the voltage difference $FV(t)-V_{REF}$ on the condition $FV(t)>V_{REF}$, namely, $I_{LED}(t)>I_N$.

Figure 5:
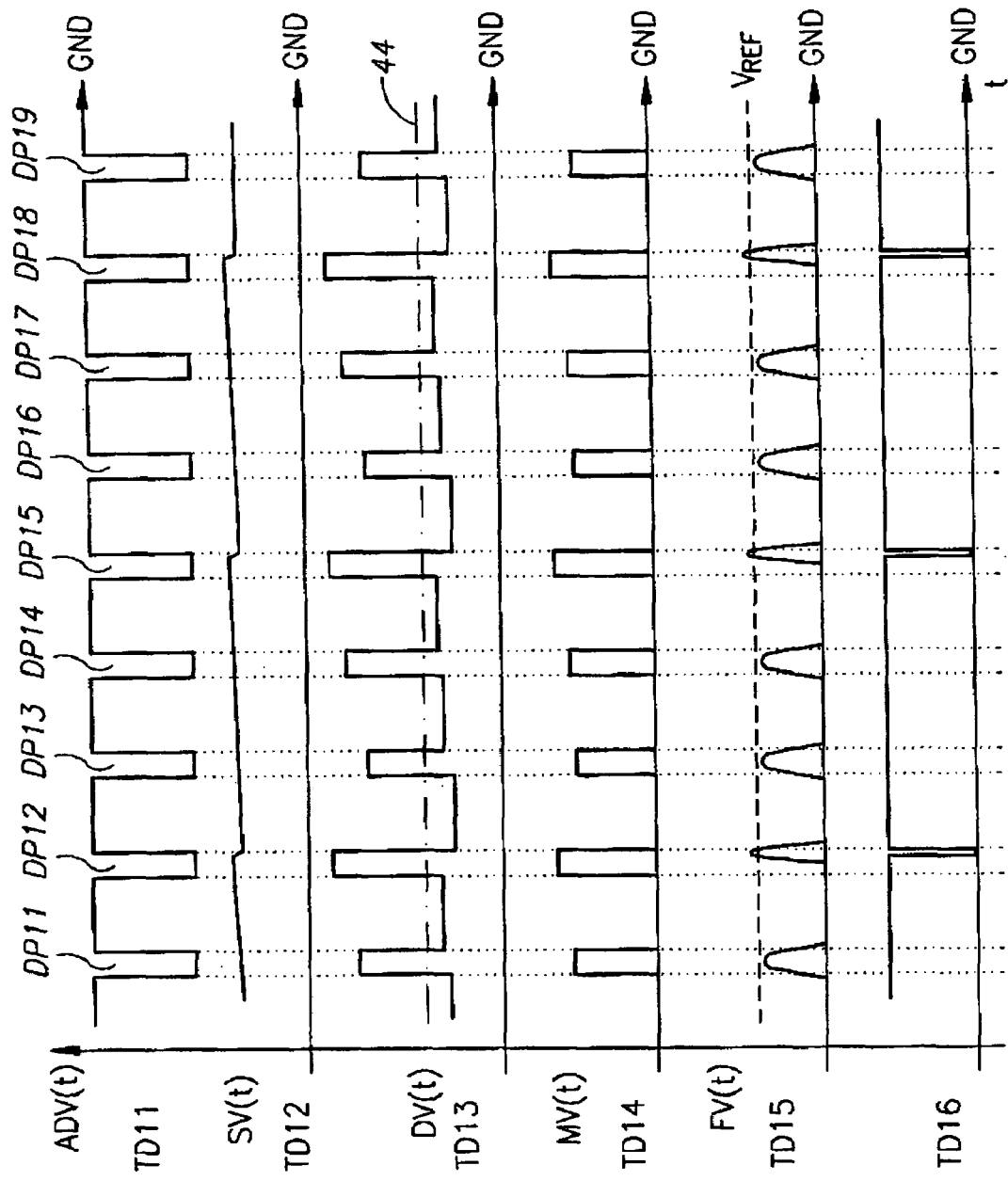
FIG. 5 shows the steady state operation of a communication light emitting circuit (CLEC) of the communication diode driver circuit (CDDC) of FIG. 1 in response to incoming digital data pulses.

FIG. 5 shows six Timing Diagrams TD11-TD16 at the same six circuit points labeled A, B, C, D, E and F respectively for demonstrating the steady state response of the CLEC 11 to nine digital data pulses DP11, DP12, DP13, ..., DP19 after having settled to its steady state operation due to a relatively continuous steady flow of incoming digital data pulses. In particular, the Timing Diagram TD13 in a similar manner as the Timing Diagram TD3 shows that the drive voltage DV(t) is greater than the threshold drive voltage 44 for each and every incoming digital data pulse for illuminating the CDs 16 accordingly. Also, the Timing Diagram TD 15 shows how the LED drive current $I_{LED}(t)$ stabilizes around the nominal LED drive current $I_N$ within a small tolerance, as evidenced by the feedback voltage FV(t) being generally smaller than the reference voltage $V_{REF}$, whereupon the shift voltage SV(t) slightly increases (see Timing Diagram TD12) but is cyclically greater than same whereupon the toggle unit 24 issues OFF digital control states to periodically open the switch 39 (see Timing Diagram TD16) for causing slights drops in the shift voltage SV(t) (see Timing Diagram TD12).

While the invention has been described with respect to a limited number of embodiments, it will be appreciated that many variations, modifications, and other applications of the invention can be made within the scope of the appended claims. For example, the shift voltage limiter 27 can alternatively be connected between the shift amplifier 22 and the integrating unit 26. The memory unit 41 can be implemented by electrical circuits other than a capacitive memory component 42 in parallel to a resistive memory component 43. The memory unit 41 can be implemented to stepwise increase the shift voltage SV(t) on the condition $I_{LED}(t)<I_N$ instead of continuously increase same. The comparator 33 may be connected in reverse to the reference voltage $V_{REF}$ and the LPF 32, thereby requiring that the operation of the integrating unit 26 also be reversed.

The invention claimed is:

1. A communication diode driver circuit (CDDC) for selectively illuminating at least one communication diode (CD) in response to incoming digital data pulses, the communication diode driver circuit comprising:
   at least one Communication Light Emitting Circuit (CLEC) having a Communication Light Emitting Branch (CLEB) with at least one CD, and designed to drive said CLEB at a nominal LED drive current $I_N$ for selectively illuminating said at least one CD,
   each CLEC of said at least one CLEC including a driver unit for comparing a pulsed analog data voltage ADV(t) corresponding to the incoming digital data pulses, and a variable shift voltage SV(t) for issuing a pulsed drive voltage DV(t) for driving said CLEB with a pulsed LED drive current $I_{LED}(t)$ for selectively illuminating said at least one CD in accordance with the incoming digital data pulses, and
   each CLEC of said at least one said CLEC including a closed loop feedback unit for tapping said CLEB for continuously monitoring a pulsed monitor voltage MV(t) directly proportional to said LED drive current $I_{LED}(t)$ for increasing said shift voltage SV(t) up to a maximum shift voltage $SV_{max}$ less than a threshold drive voltage for continuously illuminating said at least one CD after a long absence of incoming digital data pulses, except for intermittently stepwise decreasing said shift voltage SV(t) in response to each single incoming digital data pulse contributing to a LED drive current satisfying the condition $I_{LED}(t)>I_N$.

2. The circuit according to claim 1 wherein said driver unit includes a shift amplifier for algebraically superimposing said analog data voltage ADV(t) and said shift voltage SV(t).

3. The circuit according to claim 1 wherein said CLEB includes a sense resistor tied to ground and said toggle unit taps said sense resistor for continuously monitoring said monitor voltage MV(t).

4. The circuit according to claim 1 wherein said feedback unit includes a toggle unit having a comparator for comparing a feedback voltage FV(t) derived from said monitor voltage MV(t) with a reference voltage $V_{REF}$ proportional to the nominal LED drive current $I_N$ for outputting a digital control state on the condition $I_{LED}(t)<I_N$, and an opposite OFF digital control state in response to each single incoming digital data pulse contributing to a LED drive current satisfying the condition $I_{LED}(t)>I_N$.

5. The circuit according to claim 4 wherein said toggle unit further includes a low pass filter (LPF) for shaping generally rectangular shaped pulses of said monitor voltage MV(t) to generally triangular shaped voltage pulses for determining the duration that said toggle unit issues said opposite digital control states on the condition $I_{LED}(t)>I_N$.

6. The circuit according to claim 1 wherein said feedback unit includes an integrating unit with a memory device for providing said shift voltage SV(t) wherein said memory device includes a memory component for continuously increasing said shift voltage SV(t) on the condition $I_{LED}(t)<I_N$.

7. The circuit according to claim 6 wherein said memory component is a capacitive memory component.

8. The circuit according to claim 7 wherein said memory device includes a resistive memory component for selectively discharging said capacitive memory component on the condition $I_{LED}(t)>I_N$.

* * * * *